3,642,759
BUTADIENE POLYMERIZATION PROCESS AND CATALYST SYSTEM COMPRISING TITANIUM TETRAHALIDE - ORGANOMAGNESIUM COMPOUND AND $H_2$ GAS
Stephen John Bodnar, Beaumont, and Chuck Linwell McHargue and Larn Carnell Anglin, Jr., Nederland, Tex., assignors to Texas-U.S. Chemical Company, Port Neches, Tex.
No Drawing. Filed Feb. 3, 1969, Ser. No. 796,155
Int. Cl. C08d 3/06
U.S. Cl. 260—94.3
12 Claims

ABSTRACT OF THE DISCLOSURE

A polymerization process for preparing homo- and copolymers of butadiene characterized by a high cis-1,4 content, said process being conducted in solvent solution utilizing an ether-free organomagnesium compound-titanium tetrahalide catalyst having the titanium in the tetravalent state and in the presence of hydrogen gas.

BACKGROUND OF THE INVENTION

Solution homopolymerization and copolymerization of butadiene in solvent colution in the presence of a complex organometallic catalyst comprising an ether-free organomagnesium compound-titanium tetrahalide catalyst has been disclosed in our copending applications Ser. No. 599,671, filed Dec. 5, 1966 and Ser. No. 658,358, filed Aug. 4, 1967 as well as in U.S. Pat. 3,357,960; these applications having been assigned to the assignee of the subject invention. The critical requirement in effectively using these catalyst systems is that the titanium in the catalyst be maintained in the tetravalent state. Despite the satisfactory performance of these catalyst systems, the polymerization processes have been found to suffer from certain disadvantages which are typically associated with solution polymerization techniques. Thus, the characteristics of the product polymer sometimes vary in relation to the high sensitivity of these catalysts to impurities in the solvent, in the catalyst, or in one of the feed materials. In addition, control over the viscosity and the molecular weight of the product polymer is achieved only by variation of the complex organometallic catalyst concentration. As a result, the preparation of polymers having the desired low Mooney viscosities is only achieved by the use of high levels of the expensive complex organometallic catalyst.

SUMMARY OF THE INVENTION

It is the prime object of this invention to provide a process for the preparation of butadiene polymers exhibiting a high amount of cis-1,4 butadiene configuration utilizing a catalyst system which enables the process to overcome the disadvantages inherent in prior art polymerization techniques. Various other objects and advantages will be apparent from the following description thereof.

It has now been discovered that the conjoint addition to the polymerization mixture of a small but significant amount of gaseous hydrogen together with the complex organometallic catalyst improves the butadiene polymerization process in several important respects. Thus, it has been found that the hydrogen addition permits a large reduction, e.g. 40–50%, in the amount of the catalyst required to prepare polymers having the desired Mooney viscosity levels. It has further been discovered that variation in the amount of hydrogen utilized will have the same general effect as a like variation in the amount of catalyst used, thereby measurably reducing the cost of the polymerization technique. An increase in the amount of hydrogen added will decrease the Mooney viscosity of the polymer produced and, correspondingly, a decrease in the amount of hydrogen added will increase the Mooney viscosity of the product polymer. This process thus provides a useful method for controlling the polymerization reaction and for producing polymers of more consistent properties.

Of special importance, we have surprisingly discovered that the addition of hydrogen gas to the polymerization system does not adversely effect the performance of the complex organometallic catalyst. Thus, it has previously been determined that the active, functional form of the catalyst is only achieved when the titanium component thereof is maintained in a tetravalent state. Precautionary measures for achieving this state have been carefully delineated in our copending application. Ser. No. 599,671, filed Dec. 5, 1966. It has been suggested that oxidizing agents be utilized to reactivate catalyst systems in which the valence state of the titanium is below four. In view of these requirements and the acknowledged reducing properties of hydrogen, it is totally unexpected that hydrogen can be advantageously utilized in conjunction with the specified catalyst system and, furthermore, that it can be utilized without the instituion of additional compensating precautionary measures.

DESCRIPTION OF THE PREFERRED EMBODIMENTS

The process of the present invention is applicable to the solution homopolymerization and copolymerization of butadiene. The butadiene may be copolymerized with at least one other polymerizable comonomer selected from the group consisting of isobutylene and vinyl-substituted aromatic hydro-carbons such as styrene. These comonomers may be utilized in a very broad ratio. Accordingly, the weight ratio of butadiene to comonomer may vary in the range from about 45 to 55 to 98 to 2.

As previously indicated, our butadiene polymers are polymerized in solution with a catalyst comprising an ether-free organomagnesium compound-titanium tetrahalide in which the titanium is essentially in the tetravalent state and extraneously added hydrogen gas.

The organomagnesium component of the polymerization catalyst corresponsd to the general formulae RMgX, $R_2Mg$, or mixtures of the two, wherein R is an aliphatic, cycloaliphatic, or aromatic radical containing from 1 to 30 carbons therein, and X is a halogen atom selected from chlorine, iodine, bromine and fluorine atoms. The titanium tetrahalide component which is described in detail in this application, is represented by the general formula $TiX_4$ wherein X is defined as in the organomagnesium compound but may represent the same or combinations of different halogen atoms.

The ether-free organomagnesium compounds usable in the catalyst system of this process are exemplified by the following: dodecyl magnesium iodide, dodecyl magnesium bromide, decyl magnesium iodide, stearyl magnesium iodide, ethyl magnesium iodide, methyl magnesium iodide, methyl magnesium chloride, myristyl magnesium bromide, nonyl magnesium iodide, nonyl magnesium fluoride, naphthyl magnesium bromide, phenyl magnesium bromide, phenyl magnesium chloride, ethyl magnesium chloride, hexyl magnesium iodide, 2-ethtylhexyl magnesium bromide, methyl cyclohexyl magnesium iodide, p-tertiary butyl benzyl magnesium iodide, hexadecyl magnesium chloride, cetyl magnesium fluoride, didodecyl magnesium, didecyl magnesium, distearyl magnesium, diethyl magnesium, dimethyl magnesium, dimyristyl magnesium, dinonyl magnesium, dinaphthyl magnesium, diphenyl magnesium, dihexyl magnesium, di- 2-ethylhexyl magnesium, dimethyl-cyclohexyl magnesium, di-p-tertiary butyl benzyl magnesium, dihexadecyl magnesium and dicetyl magnesium.

The organomagnesium compounds can be prepared in the manner described in the aforementioned copending application, Ser. No. 599,671, or in accordance with the procedure disclosed in U.S. Pat. 3,264,360.

The titanium tetrahalide of the catalyst system employed in this invention is exemplified by the following: titanium tetraiodide, titanium tetrabromide, titanium tetrachloride, titanum tetrafluoride and mixed titanium tetrahadiles such as titanium dichloride diiodide, titanium dibromide diiodide and titanium monobromide triiodide. The titanium iodides, are preferably used when a high cis content polymer is being prepared.

The catalyst components are utilized in a mole ratio of from about 10 to 1 to 1 to 10, organomagnesium compound to titanium tetrahalide. Inasmuch as organomagnesium compounds in solution are an equilibrium mixture of $RMgX$ and $R_2Mg$, it is convenient to express the concentration of this component of the catalyst in terms of equivalents of R-Mg per mole of titanium tetrahalide. Thus, in forming polymers having a cis content above about 80%, an equivalent to mole ratio between 2 to 1 and 10 to 1, organomagnesium compound to titanium tetrahalide is used.

The concentration of catalysts employed in the polymerization reaction may also be expressed in terms of moles of catalyst, i.e. equivalents of organomagnesium compound plus moles of titanium tetrahalide, per mole of butadiene reactant. An equivalent of organomagnesium compound is defined as the amount of compound hydrolyzed by an equivalent weight of acid measured by acid-base titration.

On this basis, the broad catalyst concentration range is between about 0.00001 and 0.01 mole of catalyst per mole of butadiene in the reaction mixture. The preferred catalyst concentration is between about 0.00001 and 0.004 mole of total catalyst per mole of butadiene.

A requirement for the ether-free organomagnesium-tetrahalide catalyst system, in order to obtain a polymer having a high cis content, is that iodine be present in the catalyst system either as elemental iodine or as a substituent of the organomagnesium compound or of the titanium tetrahalide. The presence of iodine in the catalyst system seems to exert a directing influence on the polymerization reaciton with the result that the butadiene component of the instant polymers has a cis content in excess of 85%.

As heretofore indicated, the titanium must be maintained in a tetravalent state in order to assume the active functional form of the catalyst. The valence of the heavy metal component of a Ziegler catalyst is typically three or less, and the titanium in the instant catalyst will be so reduced if certain precautions are not taken to maintain it in its tetravalent state. A detailed discussion of these catalysts and of methods for their preparation and use are presented in our copending application Ser. No. 599,671, filed Dec. 5, 1966. In general, ether-free organomagnesium-titanium tetrahalide catalysts which retain their tetravalency are prepared according to one of the following methods:

(1) The catalyst components are added separately to the reaction mixture thereby effecting the "in-situ" formation of the catalyst;

(2) An oxidizing agent, such as oxygen, halogen and hydroperoxides, are added to the reaction mixture in order to activate the premixed but inactive catalyst present therein; a typical example being the addition of from about 1 to 10% of iodine, based on the weight of total catalyst;

(3) The catalyst components are premixed and maintained at a temperature of 0° C. or below prior to their addition to the reaction mixture; and, (4) The catalyst components are premixed in a concentrated slurry in an inert hydrocarbon solvent at a concentration of at least about 10%, by weight, and preferably in excess of 50%, by weight;

all as set forth in detail in said copending application, issued Jan. 28, 1969 as U.S. Pat. 3,424,736 which is to be considered fully incorporated herein.

The preferred procedure for preparing the active ether-free organomagnesium-titanium tetrahalide catalyst system is the "in-situ" approach. Thus, the individual catalyst components, i.e. the ether-free organomagnesium compound and the titanium tetrahalide, are added separately to the reaction mixture containing the desired monomeric components, and form the catalyst within the total reaction system. In this manner, the conversion of the active catalyst to an inactive reduced state is substantially eliminated.

As previously indicated, the addition of hydrogen to the polymerization system provides a useful method for controlling both the polymerization reaction and the nature of the polymeric products. The hydrogen may be added all at one time in the beginning of the polymerization or at some stage during the polymerization, or it may be added in increments during the polymerization process or continuously throughout the polymerization process, or it may be mixed with an inert gas such as nitrogen and sparged through the reaction mixture, or maintained as a blanket over the reaction mixture. The amount of hydrogen added will depend upon the desired molecular weight of the polymeric product, the nature of the catalyst system and the monomeric components as well as upon temperature, and hydrogen pressure conditions, etc. In general, the amount of hydrogen added is between about 0.001 and 1.0, and preferably between 0.003 and 0.1, standard cubic foot of hydrogen per pound of polymer produced. A "standard" cubic foot of gas is that measured at 32° F. and 29.92 inches of mercury. Any hydrogen pressure may be used up to that at which extensive hydrogenation of the monomer occurs but preferably at a level which will not exceed 200 pounds per square inch. After the polymerization reaction is complete, the unreacted hydrogen may be recovered and re-used as such or after purification. Hydrogen or its ordinary isotopic mixture may be used in accordance with this invention such for example, as hydrogen enriched in deuterium. Mixtures of hydrogen and inert gases such as nitrogen may also be used.

The polymerization is conducted in an inert hydrocarbon solvent or in a solvent mixture of inert hydrocarbon solvents or an inert hydrocarbon solvent and an olefin. The hydrocarbon solvent may be an aromatic hydrocarbon, a cycloparaffin or a mixture of these solvent types. Preferred solvents include cyclohexane, benzene, toluene, and xylene.

In these butadiene polymerizations, a useful olefin co-solvent is isobutylene, which can be used in quantities up to four times the amount of butadiene monomer present. Above this level a copolymer of butadiene and isobutylene results in accordance with the teachings of U.S. Pat. No. 3,357,960. Thus, typical hydrocarbon-olefin solvent mixtures include benzene-isobutylene and toluene-isobutylene mixtures.

The polymerization process may be carried out over a wide range of temperatures, with the starting temperature ranging from about −10° C. to 100° C. The preferred starting temperature range is from 0° C. to 50° C. The temperature rises during polymerization but is preferably maintained below about 95° C. The polymerization reaction is preferably carried out at pressures sufficient to maintain the monomeric materials in the liquid state. The specific pressure utilized is dependent upon the monomers being polymerized, the solvent mixture utilized, and the polymerization temperature. The polymerization pressure may be autogeneously derived or may be built up by the addition of a gas which is inert with respect to the polymerization reaction. Broadly speaking, pressures between atmospheric and 500 p.s.i.g. may be employed.

The reaction may be carried out as a batch process by charging the reactness into a suitable reactor, adding the catalyst and thereafter passing the desired amount of hydrogen through the reactor. The process may also be conducted in a continuous manner by maintaining the specified quantities of reactants in a reactor for suitable residence time. The residence time may be varied widely depending upon the reaction conditions and solvents utilized, and the characteristics which are desired in the final polymeric product. Typical residence times range from about 20 to 120 minutes, and preferably 30 to 60 minutes.

The polymerization reaction is "short-stopped" at the end of the desired reaction period by the addition of a short-stopping agent which inactivates the catalyst. The preferred short-stopping agents are water, alcohols or acids. These include alcohols such as ethyl alcohol and isopropyl alcohol, and organic and inorganic acids. It has also been found advantageous to add an anti-oxidant to the polymer mixture just prior to the addition of the short-stopping agent. The anti-oxidant may be any of the conventional anti-oxidants or stabilizers for rubbers which are disclosed in the literature such, for example, as the thiobisphenols, the alkylated phenyl phosphites, etc.

After the reaction is short-stopped, the polymer may be separated from the solvent by any of the well-known isolation procedures. In particular, separation may be effected by the addition of a precipitation agent causing the polymer to precipitate, or by removal of the solvent from the polymer, e.g., by steam stripping the solvent. Low molecular weight alcohols, such as methyl, ethyl and isopropyl alcohols have been found to be efficient precipitants for the polymer. These alcohols can also be used as the short-stopping agent. Larger amounts of alcohol are necessary to precipitate the polymer than are necessary to short-stop the reaction. The reaction may be short-stopped and the polymer precipitated in a single step by addition of a large amount of alcohol. The steam stripping of the solvent to recover the polymer and solvent is preferred in continuous polymerization processes. Following steam stripping, the polymer is dewatered and dried in the conventional manner. Other separation methods include steam flocculation and the formation and subsequent precipitation of a polymer latex.

The polymers produced in accordance with the process of this invention may be either rubbery solid or liquid, depending upon their molecular weight. In the vulcanized state they are elastomeric materials. These polymers may be worked in conventional fashion on rubber working machinery. They may also be compounded with standard compounding ingredients such as oil extenders, fillers including carbon black and silica, activators, accelerators, curing agents, anti-oxidants, pigments, etc.

The process of the present invention is further illustrated by the following examples in which all parts are by weight except when otherwise noted. All catalyst concentrations, in these examples, are expressed in moles per mole of butadiene monomer in the reaction system.

EXAMPLE I

This example demonstrates the novel process of this invention wherein hydrogen is used in conjunction with an organomagnesium-titanium tetrahalide catalyst in the preparation of a 90 Mooney viscosity (ML–4 at 212° F.) polybutadiene polymer.

A 10%, by weight, solution of butadiene in benzene was charged continuously into a 67 gallon reactor at a temperature of 35° F. by pumping 68.3 gallons per hour (g.p.h.) of bezene and 12.7 g.p.h. of butadiene into the reactor feed line. To this mixture was added 0.39 millimole of titanium tetraiodide per 100 parts of butadiene monomer charge or the equivalent of 0.21 millimole per mole of butadiene charge. The reaction mixture was stirred, and 0.98 milliequivalent of phenylmagnesium compound per hundred parts of butadiene monomer was added to initiate the reaction; the phenylmagnesium compound having been prepared from chlorobenzene and magnesium. The latter figure was equivalent to 2.50 equivalents of organomagnesium compound per mole of titanium tetraiodide, and represented a concentration of 0.0007 mole of total catalyst per mole of butadiene monomer. During the polymerization reaction, 0.009 standard cubic foot of hydrogen per estimated pound of polymer at 85% conversion was continually bubbled through the reaction mixture. The reaction product stream was terminated at approximately the 85% conversion level (50 minutes residence time) by the addition of water, at which point the reaction had exothermed to 88° C. The final reaction product, which was isolated by means of a steam stripping operation had a Mooney viscosity of 90.

In a similar operation, with the exception that hydrogen was omitted from the system, 0.43 millimole of titanium tetraiodide and 1.33 milliequivalents of ether-free phenylmagnesium compound per 100 parts of butadiene monomer were required to produce the same 90 Mooney viscosity polybutadiene. These values are equivalent to 0.00095 mole of total catalyst per mole of butadiene charge and represent a 35% increase in catalyst requirement over the hydrogen-containing system. It is thus readily apparent that the presence of hydrogen in the system enables the practitioner to reduce the amount of expensive catalyst used while still being able to prepare the desired, high quality polymeric product.

EXAMPLE II

The polymerization procedure set forth in Example I was repeated for the purpose of preparing a cis 1,4-polybutadiene polymer having a Mooney viscosity of 65. A comparison of hydrogen and non-hydrogen containing systems was made in preparing this product. The pertinent reaction variables are presented hereinbelow and are based on one mole of butadiene monomer:

| | | |
|---|---|---|
| Titanium tetraiodide (moles) | 0.00027 | 0.00022 |
| Phenylmagnesium compound (epuivalents) | 0.00080 | 0.00068 |
| Total catalyst (moles plus epuivalents) | 0.00107 | 0.00090 |
| Hydrogen (std. cu. ft. per estimated lb. of rubber) | | 0.146 |
| Conversion (percent) | 80.8 | 80.4 |
| Mooney viscosity (ML–4 at 212° F.) | 71 | 63 |

The data clearly demonstrate that the use of hydrogen permits a major reduction in catalyst requirement without having an adverse effect on the polymerization reaction or product.

Furthermore, at one point during the hydrogen run, the gas was turned off and the catalyst level allowed to remain constant. The Mooney viscosity of the product rapidly increased to about 120. Upon readmitting the hydrogen to the system at a rate of 0.4 std. cu. ft. per lb. of polymer, the Mooney viscosity showed a substantial drop to 30. In order to accomplish a similar reduction in Mooney viscosity, in a system which is devoid of hydrogen, a prohibitive quantity of expensive catalyst would be required.

EXAMPLE III

This example further demonstrates the use of hydrogen in the preparation of a variety of cis 1,4-polybutadiene products.

The polymers of this example were prepared by charging a one gallon reactor with 4.43 milliequivalents of ether-free phenylmagnesium compound dissolved in 2378 grams of benzene. To this solution, 207 grams of butadiene were added; and the polymerization was initiated by the further addition of 1.61 millimoles of titanium tetraiodide dissolved in benzene. The systems thus contained the equivalent of 0.00157 mole of total catalyst per mole of butadiene.

During the reaction, hydrogen was fed into the reactor at the rates set forth in the table below. The reactions were allowed to run for approximately 60 minutes, after which water was added to shortstop the reaction. An anti-oxidant was added, and the polymer was separated from the benzene solvent by an alcohol coagulation technique and dried. The Mooney viscosity values of the resulting polymeric products were determined along with values for control polymers prepared by the same procedure but without the hydrogen present.

| Polymer No. | Hydrogen addition rate (std. cu. ft./lb. of polymer) | Mooney viscosity (ML-4 at 212° F.) |
|---|---|---|
| 1 | 0.009 | 104 |
| 2 | | 112 |
| 3 | 0.021 | 91 |
| 4 | | 118 |
| 5 | 0.039 | 101 |
| 6 | | 106 |
| 7 | 0.051 | 29.5 |
| 8 | | 102 |
| 9* | 0.051 | 14 |
| 10* | | 78.5 |

* Total catalyst concentration increased by 10%, by weight.

It can readily be seen from this data that the use of hydrogen has a pronounced effect on the Mooney viscosity, and correspondingly on the molecular weight, of the polymerization product.

EXAMPLE IV

The polymerization procedure set forth in Example I was repeated utilizing the following pertinent operation variables as based on one mole of butadiene monomer charge:

| | | |
|---|---|---|
| Titanium tetraiodide (moles) | 0.00018 | 0.00018 |
| Phenylmagnesium compound (equivalents) | 0.00045 | 0.00048 |
| Total catalyst (moles plus equivalents) | 0.00063 | 0.00066 |
| Hydrogen (std. cu. ft. per estimated lb. of rubber) | | 0.09 |
| Conversion (percent) | 86.1 | 85.1 |
| Mooney viscosity (ML-4 at 212° F.) | 94 | 27 |
| Polymer structure (percent): | | |
| Cis | 95 | 95 |
| Trans | 2 | 2 |
| Vinyl | 3 | 3 |

The results summarized above clearly illustrate the advantages derived from the presence of extraneous hydrogen in the polymerization system. Thus, the practitioner is provided with great flexibility in the preparation of polymers exhibiting a wide variety of molecular weights without necessarily depending upon an increase in the concentration of expensive complex organometallic catalyst systems. Furthermore, it is to be noted that the desired polymeric structure is not adversely affected as a result of the presence of hydrogen in the catalyst system.

EXAMPLE V

The cis 1,4-polybutadiene polymerization procedure set forth in Example I, hereinabove, was repeated utilizing the following pertinent operation variables based on one mole of butadiene monomer charge:

| | | |
|---|---|---|
| Titanium tetraiodide (moles) | 0.00024 | 0.00016 |
| Phenylmagnesium chloride (equivalents) | 0.00070 | 0.00047 |
| Total catalyst (moles plus equivalents) | 0.00094 | 0.00063 |
| Hydrogen (std. cu. ft. per estimated lb. of rubber) | | 0.11 |
| Conversion (percent) | 82.1 | 88.6 |
| Mooney viscosity (ML-4 at 212° F.) | 75 | 81 |
| Polymer structure (percent): | | |
| Cis | 95 | 95 |
| Trans | 2 | 2 |
| Vinyl | 3 | 3 |

It will be noted from the data that a 33% reduction in the amount of catalyst required is readily compensated for through the use of hydrogen gas in the system.

EXAMPLE VI

The polymerization procedure set forth in Example I, hereinabove, was repeated utilizing the following pertinent reaction variables based on one mole of butadiene monomer charge:

| | | | |
|---|---|---|---|
| Titanium tetraiodide (moles) | 0.00027 | 0.00019 | 0.00014 |
| Phenylmagnesium compound (equivalents) | 0.00068 | 0.00045 | 0.00035 |
| Total catalyst (moles plus equivalents) | 0.00095 | 0.00064 | 0.00049 |
| Hydrogen (std. cu. ft. per estimated lb. of rubber) | | 0.05 | 0.09 |
| Conversion (percent) | 82.4 | 80.1 | 81.4 |
| Mooney viscosity (ML-4 at 212° F.) | 57 | 48 | 51 |

The data summarized above clearly demonstrate the control which is attainable over a cis 1,4-polybutadiene polymerization reaction through the presence of hydrogen in the system. It also indicates the potential for substantial reductions in the catalyst concentration without adversely affecting the polymerization reaction and product.

It is to be noted that the physical properties exhibited by the cis 1,4-polybutadienes produced in the foregoing examples show the hydrogen-controlled polymers to be equivalent in all respects to the cis 1,4-polybutadienes produced with the catalyst systems disclosed in the aforementioned pending application, Ser. No. 599,671.

Similar advantageous polymerizations are obtained using hydrogen in conjunction with other applicable organomagnesium-titanium tetrahalide catalyst systems such, for example, as dodecyl magnesium bromide-titanium tetraiodide, diphenylmagnesium-titanium tetraiodide, and diphenylmagnesium, phenylmagnesium chloride-titanium tetraiodide systems. In such polymerization, butadiene may be homopolymerized or copolymerized with comonomers such as isobutylene and styrene. Obviously other solvents and shortstopping agents such as those described hereinbefore may be used.

It is also critical to fully comprehend the unique and totally unexpected results which are illustrated in the foregoing examples. Thus, polymerization reactions which are dependent upon catalyst systems containing the titanium component in a tetravalent state are successfully completed in spite of the presence therein of hydrogen gas, a known reducing agent whose natural tendency would be to reduce the valence of the titanium component thereby inactivating the total catalyst system. The import of this discovery is even more surprising in the realization that not only are polymerization reactions successfully conducted, but that the present of hydrogen provides advantages which were not available heretofore.

Variations may be made in proportions, procedures and materials without departing from the scope of this invention which is defined by the following claims.

What is claimed is:

1. A process for the preparation of butadiene polymers selected from the group consisting of polybutadiene and copolymers of butadiene with at least one other polymerizable comonomer selected from the class consisting of isobutylene and vinyl-substituted aromatic hydrocarbons, the butadiene component of said polymer having a controlled 1,4 structure and configuration, said process comprising contacting at least a butadiene monomer, in an inert aromatic hydrocarbon solvent at an initial temperature of from about −10° C. to 100° C., with a catalyst comprising (a) an ether-free organomagnesium compound corresponding to the formula selected from the group consisting of $RMgX$, $R_2Mg$, and mixtures thereof, wherein R is a radical selected from the group consisting of aliphatic, cycloaliphatic and aromatic radicals containing from 1 to 30 carbon atoms and X is a halogen atom selected from the group consisting of chlorine, iodine, bromine and fluorine atoms; and, (b) a titanium tetrahalide, said catalyst containing the titanium essentially in the tetravalent state, and conducing said polymerization in the presence of hydrogen and recovering the polymer product of said polymerization.

2. The process of claim 1, wherein said catalyst is present in a concentration of from about 0.00001 to 0.01 mole per mole of butadiene.

3. The process of claim 2, wherein the mole ratio of said organomagnesium compound to said titanium tetrahalide in said catalyst ranges from about 10:1 to 1:10.

4. The process of claim 1, wherein said polymerization is conducted in the presence of from about 0.001 to 1.0 standard cubic foot of hydrogen per pound of butadiene polymer produced.

5. The process of claim 1, wherein from about 2 to 55%, by weight, of at least one monomer selected from the group of isobutylene and vinyl-substituted aromatic hydrocarbon monomers is present in said polymerization system in addition to said butadiene monomer.

6. A process for the preparation of polybutadiene characterized by a cis configuration of at least 80%, said process comprising contacting butadiene in an inert aromatic hydrocarbon solvent at an initial temperature of from about 0° C. to 100° C., with an iodine-containing catalyst comprising
(a) an ether-free organomagnesium compound corresponding to the formula selected from the group consisting of RMgX, R$_2$Mg and mixtures thereof, wherein R is a radical selected from the group consisting of aliphatic, cycloaliphatic and aromatic radicals containing from 1 to 30 carbon atoms and X is a halogen atom selected from the group consisting of chlorine, iodine, bromine and fluorine atoms; and
(b) a titanium tetrahalide, said catalyst containing the titanium essentially in the tetravalent state, and
conducing said polymerization in the presence of hydrogen, and recovering the polymer product of said polymerization.

7. The process of claim 6, wherein said catalyst is present in a concentration of from about 0.00001 to 0.004 mole per mole of butadiene.

8. The process of claim 7, wherein the equivalent to mole ratio of said organomagnesium compound to titanium tetrahalide in said catalyst ranges from about 2:1 to 10:1.

9. The process of claim 6, wherein said polymerization is conducted in the presence of from about 0.001 to 1.0 standard cubic foot of hydrogen per pound of polybutadiene produced.

10. The process of claim 9, wherein said polymerization is conducted in the presence of from about 0.003 to 0.1 standard cubic foot of hydrogen per pound of polybutadiene produced.

11. The process of claim 6, wherein said catalyst is formed by the separate addition of the organomagnesium compound and titanium tetrahalide to the butadiene.

12. The process of claim 11, wherein said titanium tetrahalide is titanium tetraiodide, the R group of said organomagnesium compound is a phenyl radical and the X group of said organomagnesium compound is a chloride atom.

References Cited
UNITED STATES PATENTS 3,051,690   8/1962   Vandenberg _____ 260—88.2
3,424,736   1/1969   Nudenberg et al. _____ 260—94.3

JOSEPH L. SCHOFER, Primary Examiner

R. A. GAITHER, Assistant Examiner

U.S. Cl. X.R.

260—84.1, 85.3

UNITED STATES PATENT OFFICE
CERTIFICATE OF CORRECTION

PO-1050
(5/69)

Patent No. 3,642,759    Dated February 15, 1972

Inventor(s) Stephen J. Bodnar, Chuck Linwell McHargue, Larn C. Anglin Jr.

It is certified that error appears in the above-identified patent and that said Letters Patent are hereby corrected as shown below:

Col. 1, Line 27, "colution" should read -- solution --

Col. 2, line 25, "instituion" should be -- institution --
Col. 2, line 46, "corresponsd" should be -- correspond --
Col. 2, line 66, "ethtylhexyl" should be -- ethylhexyl --
Col. 3, line 4, "The" should be -- these --
Col. 3, line 11, "titainum" (first appearance) should be -- titanium --
Col. 3, line 12, "tetrahadiles" should be tetrahalides --
Col. 3, line 47, "reaciton" should be -- reaction --
Col. 3, line 67, "halogen" should be -- halogens --
Col. 5, line 6, "reactness" should be -- reactants --
Col. 5, line 75, "bezene" should be -- benzene --
Col. 6, line 46, "epuivalents" should be -- equivalents --
Col. 6, line 47, "epuivalents" should be -- equivalents --

Col. 8, line 48, "present" should be -- presence --
Col. 8, line 75, "conducing" should be -- conducting --
Col. 9, line 34, "conducing" should be -- conducting --
Col. 10, line 22, "chloride" should be -- chlorine --

Signed and sealed this 4th day of July 1972.

(SEAL)
Attest:

EDWARD M. FLETCHER, JR.
Attesting Officer

ROBERT GOTTSCHALK
Commissioner of Patents